(No Model.)
E. C. CONDIT.
FURNACE JOINT.
No. 292,537. Patented Jan. 29, 1884.
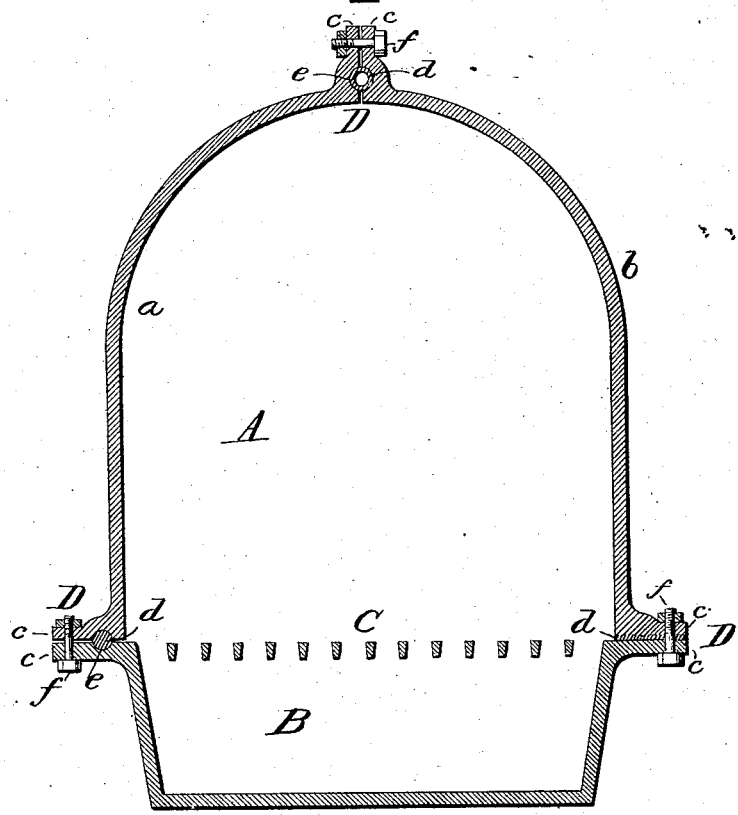
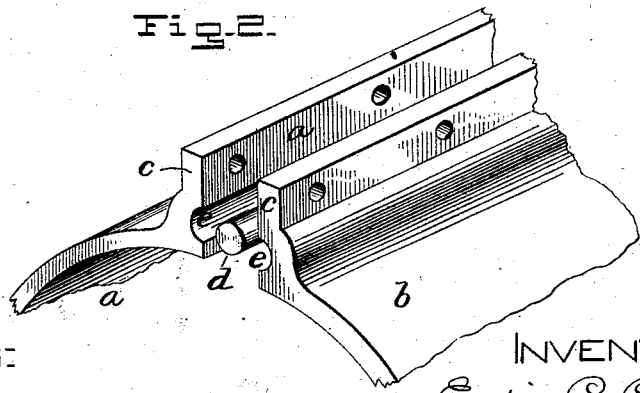
WITNESSES:
Jas. F. DuHamel
Walter S. Dodge
INVENTOR:
Ezekiel C. Condit,
by Dodge & Son
Attys.

UNITED STATES PATENT OFFICE.

EZEKIEL C. CONDIT, OF KANSAS CITY, MISSOURI.

FURNACE-JOINT.

SPECIFICATION forming part of Letters Patent No. 292,537, dated January 29, 1884.

Application filed January 8, 1883. (No model.)

*To all whom it may concern:*

Be it known that I, EZEKIEL C. CONDIT, of Kansas City, in the county of Jackson and State of Missouri, have invented certain Improvements in Furnace-Joints, of which the following is a specification.

My invention relates to the formation of gas-tight joints in stoves and furnaces; and it consists in introducing between the two parts to be united a strip or rod of metal having a greater expansibility than said parts, which latter are bolted or otherwise firmly held together. Being thus drawn together while cold, the parts will, when expanded by heat, press upon the interposed strip or rod, which, also expanding, and to a greater degree than the said parts, will maintain a close and perfect joint between them.

The invention further consists in employing for such intermediate rod or strip a metal or material softer than the parts to be united, and sufficiently so to enable any slight roughnesses or projections—such as sand-marks from a mold—to embed themselves into the interposed strip or rod, and thus to render the joint still more perfect than it would otherwise be. Ordinarily the interposed rod or strip will be of copper, while the furnace or stove castings are invariably of iron, or almost universally so.

It is a fact well known that copper expands more than iron when subjected to an increase of temperature, and hence, the parts to be united being first drawn firmly against opposite sides of the copper, and held by bolts or other fastenings against separation, the expansion of the copper will cause it to fill every particle of the space between the parts, and to force its way into any slight depressions that may exist in the faces against which it bears.

In the drawings, Figure 1 represents a vertical cross-section of a furnace-body having joints formed in accordance with my invention; Fig. 2, a perspective view, showing the joint more in detail.

The furnace, stove, or other structure may be of any desired or common form, the joints being formed at such place or places as may be found most expedient. In the example illustrated, A represents the fire-box, B the ash-pan, and C the grate-bars, the fire-box being formed of two sections, *a* and *b*, united at the top, along the middle, and also connected, by the improved joint, with the ash-pan.

D represents the joint as a whole, *c c* the edges or surfaces to be united, and *d* the interposed rod or strip of copper or equivalent material.

In practice I prefer to use a cylindrical rod of copper, and to seat the same in two grooves or recesses, *e*, of substantially semicircular form, made in the opposing faces of the parts to be united, and of a depth somewhat less than half the diameter of the rod, so that the rod shall have a bearing in the grooves before the parts in which the grooves are made are permitted to come together, though of course the space left between them is very slight ordinarily.

Instead of copper, any other metal or other fire-resisting material of greater expansibility than cast-iron may be employed, and, instead of semicircular grooves and cylindrical rods or strips, any other desired form may be adopted; or the grooves may be wholly omitted, and the parts to be joined be formed with straight faces.

Copper being quite expensive, the rods or strips may, if desired, be made of tubular form, as indicated in the joint at the top of the fire-box.

As the construction of the furnace, aside from the formation of the joints uniting its sections, constitutes no part of my invention, I have shown only the outer shell, or the fire-box and ash-pan, said parts being sufficient to give a full and clear understanding of the invention.

In the drawings, bolts *f* are shown for drawing and holding the parts together; and ordinarily bolts will be used, though clamps or other fastenings might be substituted, if found expedient.

Wrought-iron strips, rods, or wire may be used in the joint to good advantage, and I wish it understood that I do not limit myself to the use of any particular metal.

Having thus described my invention, what I claim is—

In combination with the parts $c$, each formed with a groove, $e$, a rod, $d$, of impressible material of a thickness greater than the joint depth of said grooves, and seated therein, and the bolts $f$, arranged as shown, to draw the parts firmly against the interposed rod, said rod being formed of a material more expansible under heat than the bolts $f$.

EZEKIEL C. CONDIT.

Witnesses:
H. L. JOHNSON,
W. C. JOHNSON.